(12) United States Patent
Kuestermann et al.

(10) Patent No.: US 12,009,662 B2
(45) Date of Patent: Jun. 11, 2024

(54) MAGNETICALLY CONTROLLABLE INDUCTOR COIL IN A SERIES CIRCUIT

(71) Applicant: Siemens Energy Global GmbH & Co. KG, Munich (DE)

(72) Inventors: Matthias Kuestermann, Nuremberg (DE); Ronny Fritsche, Hartenstein OT Rupprechtstegen (DE); Thomas Manthe, Ueckermuende (DE); Thomas Hammer, Schwabach (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 429 days.

(21) Appl. No.: 17/416,613

(22) PCT Filed: Nov. 18, 2019

(86) PCT No.: PCT/EP2019/081582
§ 371 (c)(1),
(2) Date: Jun. 21, 2021

(87) PCT Pub. No.: WO2020/126249
PCT Pub. Date: Jun. 25, 2020

(65) Prior Publication Data
US 2022/0085732 A1 Mar. 17, 2022

(30) Foreign Application Priority Data
Dec. 18, 2018 (DE) .......................... 102018222183.9

(51) Int. Cl.
*H02J 3/18* (2006.01)
*H01F 29/14* (2006.01)
(Continued)

(52) U.S. Cl.
CPC ............ *H02J 3/1807* (2013.01); *H01F 29/14* (2013.01); *H02M 1/08* (2013.01); *H02M 7/537* (2013.01)

(58) Field of Classification Search
CPC .......... H02J 3/16; H02J 3/1807; H02J 3/1814; H01F 29/14
See application file for complete search history.

(56) References Cited

U.S. PATENT DOCUMENTS

| 2,169,093 A | 8/1939 | Edwards |
| 6,144,191 A * | 11/2000 | Raedy ................... H02M 5/293 323/207 |

(Continued)

FOREIGN PATENT DOCUMENTS

| CN | 107134957 A | 9/2017 |
| EP | 3168708 A1 | 5/2017 |

*Primary Examiner* — Gustavo A Rosario-Benitez
(74) *Attorney, Agent, or Firm* — Laurence A. Greenberg; Werner H. Stemer; Ralph E. Locher

(57) ABSTRACT

An apparatus for dynamic load flow control in high-voltage networks has at least one phase conductor and first high-voltage connection for connection to each phase conductor. Each first high-voltage connection has first and second core sections of a closed magnetic circuit and first and second high-voltage windings surrounding respective core portions and connected in parallel. The core portions and windings are in a tank filled with ester fluids. At least one saturation switching branch outside the tank saturates the core sections and has controllable power semiconductor switches. A control unit controls the power semiconductor switches. The first and second high-voltage windings are connected at high-voltage ends to associated first high-voltage connections and at low-voltage ends to respective saturation switching branches. The device is connectable in series into the high-voltage network, with the saturation switching branches electrically insulated from ground potential.

12 Claims, 5 Drawing Sheets

(51) Int. Cl.
*H02M 1/08* (2006.01)
*H02M 7/537* (2006.01)

(56) References Cited

U.S. PATENT DOCUMENTS

| | | | |
|---|---|---|---|
| 10,056,886 B2 | 8/2018 | Bunin et al. | |
| 2002/0140294 A1* | 10/2002 | Iwata | H02J 3/1807 |
| | | | 307/103 |
| 2010/0194373 A1* | 8/2010 | Hamberger | H01F 27/38 |
| | | | 323/356 |
| 2013/0201592 A1* | 8/2013 | Hamberger | H01F 27/38 |
| | | | 361/157 |
| 2013/0320940 A1 | 12/2013 | Dimitrovski | |
| 2014/0247554 A1* | 9/2014 | Sharma | H01F 27/02 |
| | | | 312/223.1 |
| 2017/0133949 A1* | 5/2017 | Pieschel | H02M 1/32 |
| 2017/0213641 A1* | 7/2017 | Hamberger | H01F 27/42 |
| 2017/0316864 A1 | 11/2017 | Ettl | |

\* cited by examiner

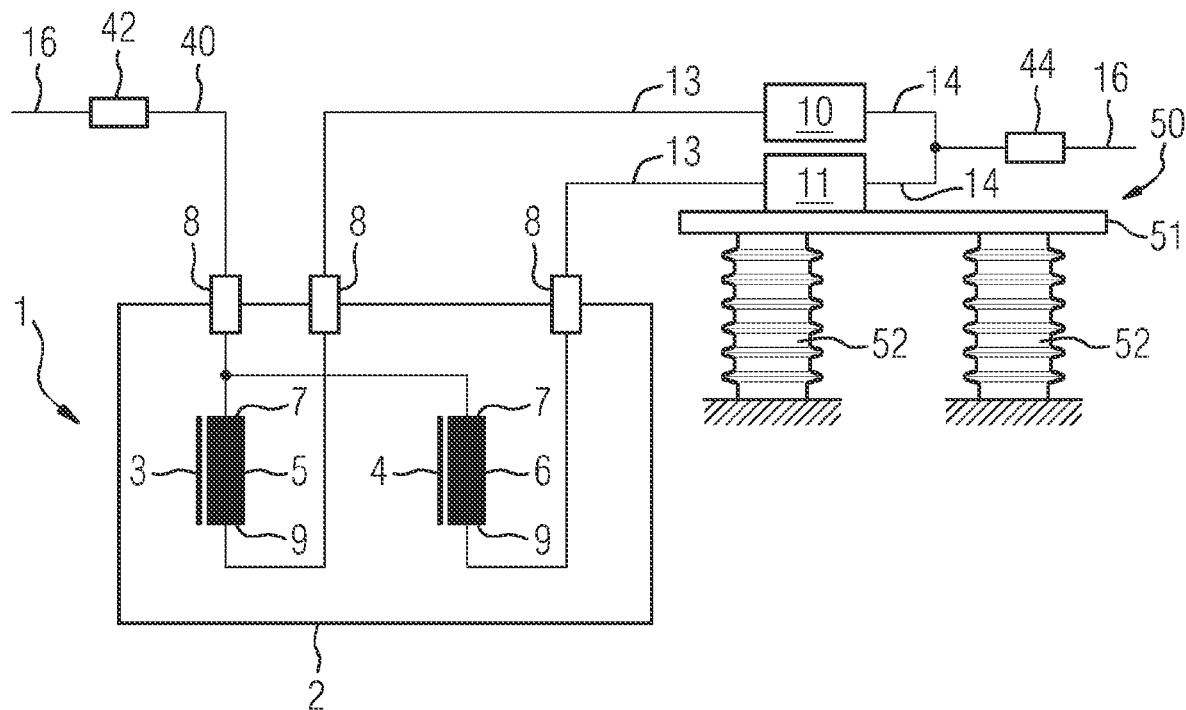
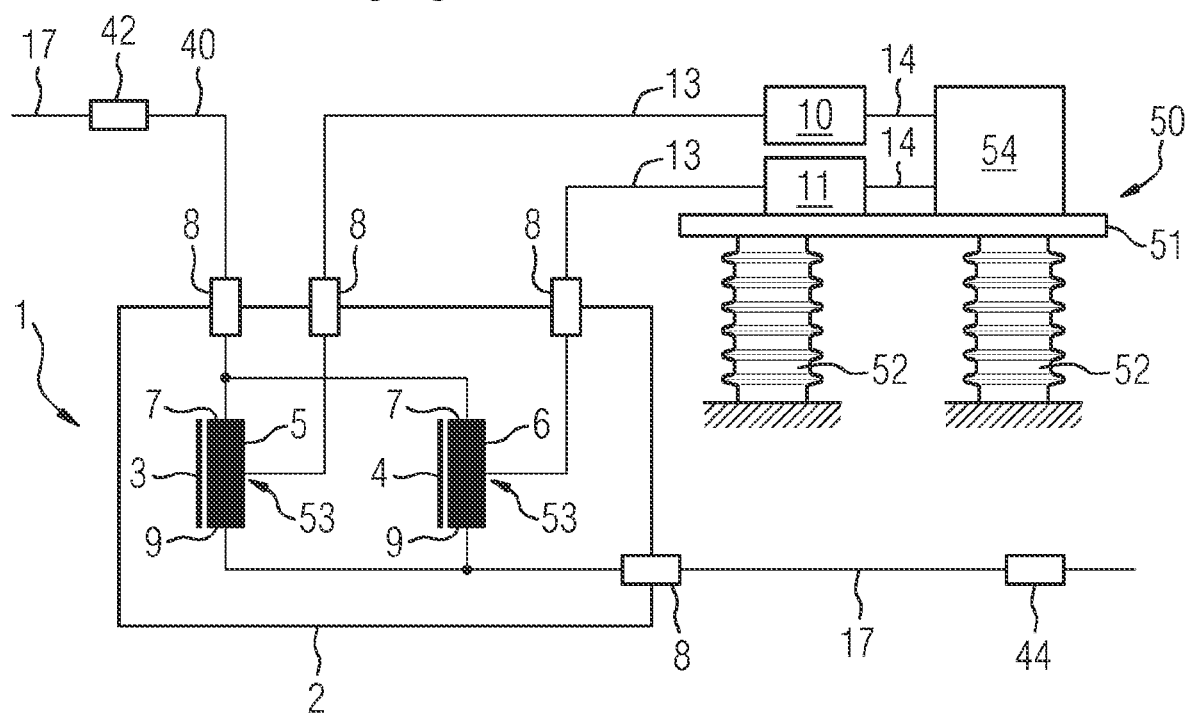

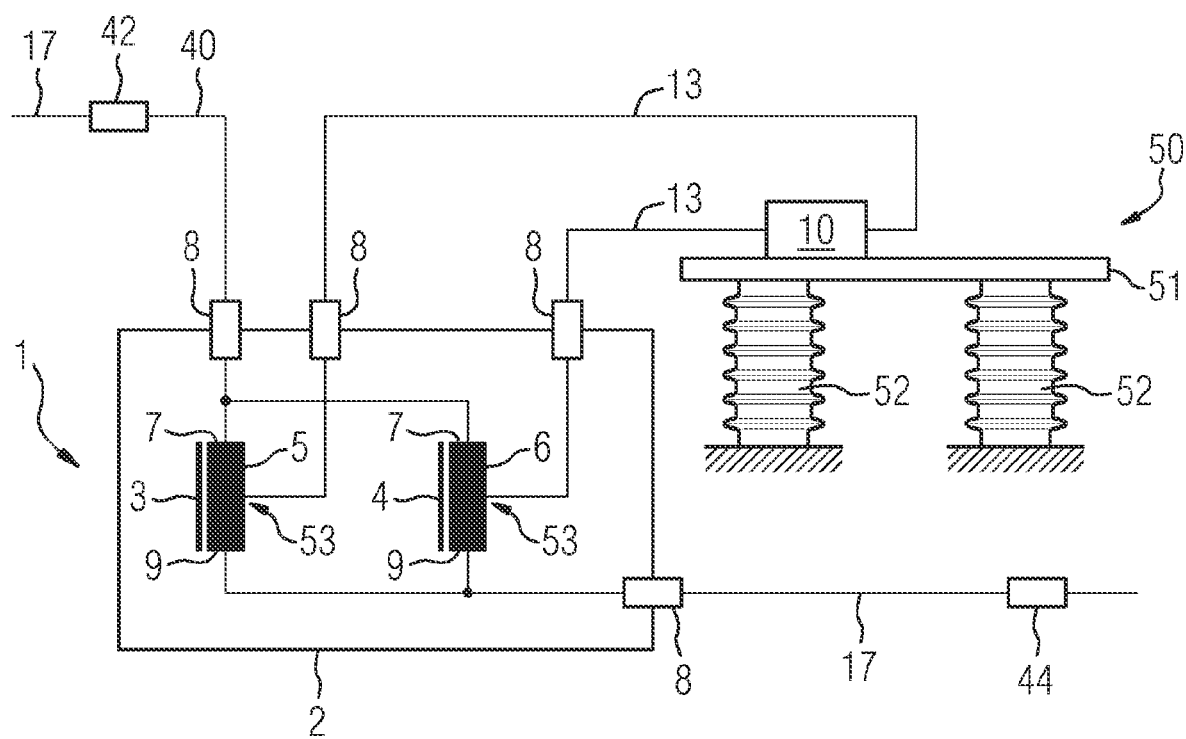

MAGNETICALLY CONTROLLABLE INDUCTOR COIL IN A SERIES CIRCUIT

BACKGROUND OF THE INVENTION

Field of the Invention

The invention relates to an apparatus for reactive power compensation in a high-voltage network having at least one phase conductor, having at least one first high-voltage connection which is configured for connection to in each case one phase conductor, wherein a first and a second core section which are part of a closed magnetic circuit and are arranged in a tank, a first high-voltage winding which surrounds the first core section and a second high-voltage winding which surrounds the second core section and is connected in parallel with the first high-voltage winding, at least one saturation switching branch which is configured to saturate the core sections and has controllable power semiconductor switches, and a control unit for controlling the power semiconductor switches are provided for each first high-voltage connection, wherein the first and second high-voltage windings are connected to the first high-voltage connection and can be connected to a or the saturation switching branch.

Such an apparatus is already known from EP 3 168 708 A1. A so-called "Full Variable Shunt Reactor" (FVSR) is disclosed there. The previously known apparatus has two high-voltage windings for each phase which are connected in parallel with one another and each surround a core limb of a closed iron core and are connected, at their high-voltage end, to a phase conductor of a high-voltage network. The low-voltage sides of the high-voltage windings can be connected either to an expediently polarized converter or directly to a ground connection with the aid of a transistor switch. The converter is configured to generate a direct current in the high-voltage winding connected to it. In this case, the direct current is set in such a manner that the core limb surrounded by the winding is driven into a desired saturation state. In this saturation state, the core material has a very low magnetic permeability, for example, as a result of which the magnetic resistance of the winding is increased and its inductance is reduced. The saturation of said core sections is dependent on polarization, with the result that an alternating current flowing via the windings flows substantially only via one of the two high-voltage windings depending on its polarization. For example, a positive alternating current flows via the first high-voltage winding, while a negative alternating current flows to ground via the second high-voltage winding. If the current is driven only via one high-voltage winding, a direct current can be applied to the respective other winding, through which the alternating current is not currently flowing, in order to saturate the core limb surrounded by it to the desired extent.

The previously known apparatus has the disadvantage that it can be connected only in a parallel circuit to the phase conductor(s) of the supply network. If an apparatus is connected in parallel, it is connected, by way of one of its sides, to the high-voltage potential of the phase conductor, while the side facing away from the high-voltage connection is at ground potential.

SUMMARY OF THE INVENTION

The object of the invention is to provide an apparatus of the mentioned at the outset in can be serially connected into the high-voltage network and which furthermore is cost effective.

The invention achieves this object by means of a second high-voltage connection which is likewise provided for connection to said phase conductor and is connected to the high-voltage winding via a or each saturation switching branch or directly, wherein each saturation branch is arranged outside the tank and is mounted such that it is electrically insulated from ground potential.

Within the scope of the invention, the second connection is a high-voltage connection. This second high-voltage connection is likewise provided for connection to the phase conductor, with the result that the entire apparatus is connected in series into the respective phase conductor. Within the scope of the invention, the saturation switching branch can be connected to the second high-voltage connection directly, that is to say—with the exception of bushings—without the interposition of further components or component parts. Alternatively, however, within the scope of the invention, it is also possible to arrange further components in the current path between the saturation switching branch and the second high-voltage connection.

Within the scope of the invention, the saturation switching branch or branches is/are mounted such that it/they is/are insulated outside the tank and for example is/are arranged on a high-voltage platform, wherein the saturation branches, by way of their power semiconductor switches and power electronics, may be at a high-voltage potential during operation. This facilitates the connection to the high-voltage windings in the tank. Voltage drops, for example in the medium-voltage range of 1 kV to 50 kV, occur between the components arranged on the high-voltage platform. However, these medium-voltage drops can be handled more cost-effectively than high-voltage drops of generally 100 kV to 800 kV, wherein the components used for this purpose are known from medium-voltage technology. Within the scope of the invention, further components, for example capacitive component parts and the like, may be arranged on the high-voltage platform.

According to a first variant of the invention, the first and second high-voltage windings are connected to the first high-voltage connection. Additional component parts or components may be arranged between the first high-voltage connection and the high-voltage windings.

A saturation branch is not arranged between the second high-voltage connection and the high-voltage windings, however.

By virtue of the fact that each high-voltage winding is arranged in a tank filled with an insulating fluid and each saturation switching branch is arranged outside the tank, the tank with its inductive components and the power electronic components of the saturation switching branch can be produced and transported independently of one another. In addition to the tank at ground potential, the inductive components comprise the high-voltage windings which are at a high-voltage potential during operation and are arranged in the tank. The liquid or gaseous insulating fluid is used for insulation and cooling and is additionally also used to cool the high-voltage windings. According to this variant, it is no longer necessary to mount or insulate the power electronics of the saturation branch, which is elevated in an insulated manner, with resistance to high voltages. On the high-voltage platform, the electrical potentials of the components arranged there differ only in the range of 1 to 52 kV. Said components can therefore be mounted closer together than at higher voltages. This results in a more compact apparatus and reduced costs.

Each saturation switching branch is advantageously arranged on a high-voltage platform which has been mounted in an electrically insulated manner.

In these variants, it is also advantageous if each saturation switching branch is connected to the high-voltage winding or windings via at least one high-voltage bushing. The high-voltage bushings make it possible to connect the respective saturation switching branch to the components of the apparatus which are arranged in the tank.

A mineral oil, an ester oil or the like comes into consideration as the insulating fluid, for example. Different insulating fluids may be provided in different tanks. However, the insulating fluid is preferably the same in all tanks. In a deviation from this, the insulating fluid may also be in the form of a protective gas. A plurality of tanks are required for example if a tank is provided for each phase of the high-voltage network.

At least one high-voltage winding advantageously has a center connection, via which said high-voltage winding is connected to a or the one saturation branch. The winding ends of the high-voltage windings are connected in this case to the first and second high-voltage connections.

According to a further development which is expedient in this respect, each high-voltage winding has a center connection which is connected to a or the saturation switching branch.

Each saturation switching branch preferably has at least one two-pole submodule with a bridge circuit which has power semiconductor switches and a DC voltage source, with the result that the DC voltage source can be either connected in series with at least one high-voltage winding or bridged depending on the control of the power semiconductor switches. When the power semiconductor switches are controlled expediently, the DC voltage source then provides the necessary voltages and direct currents for saturating the core of the high-voltage windings.

Each submodule is preferably in the form of a full-bridge circuit having a first series circuit branch and a second series circuit branch which are each connected in parallel with the DC voltage source. Each series circuit branch has a series circuit comprising two power semiconductor switches, wherein the potential point between the power semiconductor switches of the first series circuit branch is connected to a first connection terminal of the submodule and the potential point between the power semiconductor switches of the second series circuit branch is connected to the second connection terminal of the submodule. Full-bridge circuits enable polarization reversal at the connection terminals, which is not possible with a so-called half-bridge circuit which has only one parallel branch with two power semiconductor switches.

Each power semiconductor switch is preferably an IGBT with a freewheeling diode connected in parallel in an opposite sense, a so-called GTO or a transistor switch. Within the scope of the invention, it is advantageous for each power semiconductor switch to be able to be changed from its interrupter position, in which a current cannot flow via the power semiconductor switch, into its on-state position, in which a current can flow via the power semiconductor switch, or vice versa. Such power semiconductor switches are also referred to as disconnectable power semiconductor switches which can even interrupt a short-circuit current flowing via them if suitable measures have been taken to reduce the energies produced in this case.

Each DC voltage source is preferably an energy store. Electrical energy stores which are preferably unipolar advantageously come into consideration as energy stores. Capacitors, supercapacitors, superconductive coils, battery accumulators, supercaps or the like come into consideration as energy stores, for example. The energy stores listed or other energy stores may appear individually in a submodule or a plurality of them are connected in series. Within the scope of the present invention, the term "energy store" is used overall to refer to this series circuit.

The energy store is expediently connected to a charging unit for charging the energy store. The energy store can preferably be connected to a supply network. This is expediently carried out via a charging unit which may fundamentally have any desired configuration within the scope of the invention. However, the important factor is that energy can be drawn from the supply network via the charging unit and can be stored in the energy store. This energy then enables the current flow for saturating the respective high-voltage winding.

Additional windings are expediently provided and are inductively coupled to the high-voltage windings, wherein the additional windings are connected to at least one capacitively acting component part. Within the scope of the invention, the additional windings are inductively coupled to at least one of the high-voltage windings of the FVSR. In this case, the additional windings are connected to a capacitively acting component part. The term "connected" is used to mean that each capacitively acting component part is electrically connected to at least one of the additional windings either directly or via an electrical component part, for example a switching unit. The capacitive component part, for example a capacitor or a "Flexible AC Transmission System" (FACTS) component equipped with capacitors, for example a "Static Synchronous Compensator" (STATCOM), can therefore influence the degree and direction of reactive power compensation. The FVSR is used primarily for load flow control, current limitation or dynamic filtering.

The capacitive component part expediently has a capacitor or a capacitor bank.

Further expedient configurations and advantages of the invention are the subject of the following description of exemplary embodiments of the invention with reference to the figures of the drawing, wherein identical reference signs refer to identically acting component parts.

BRIEF DESCRIPTION OF THE SEVERAL VIEWS OF THE DRAWING

FIG. 4 shows a further exemplary embodiment of the apparatus according to the invention with elevated saturation switching branches, FIG. 5 shows a further exemplary embodiment of the apparatus according to the invention, and FIG. 6 shows yet another further exemplary embodiment of the apparatus according to the invention.

DETAILED DESCRIPTION OF THE INVENTION

Figure 1:
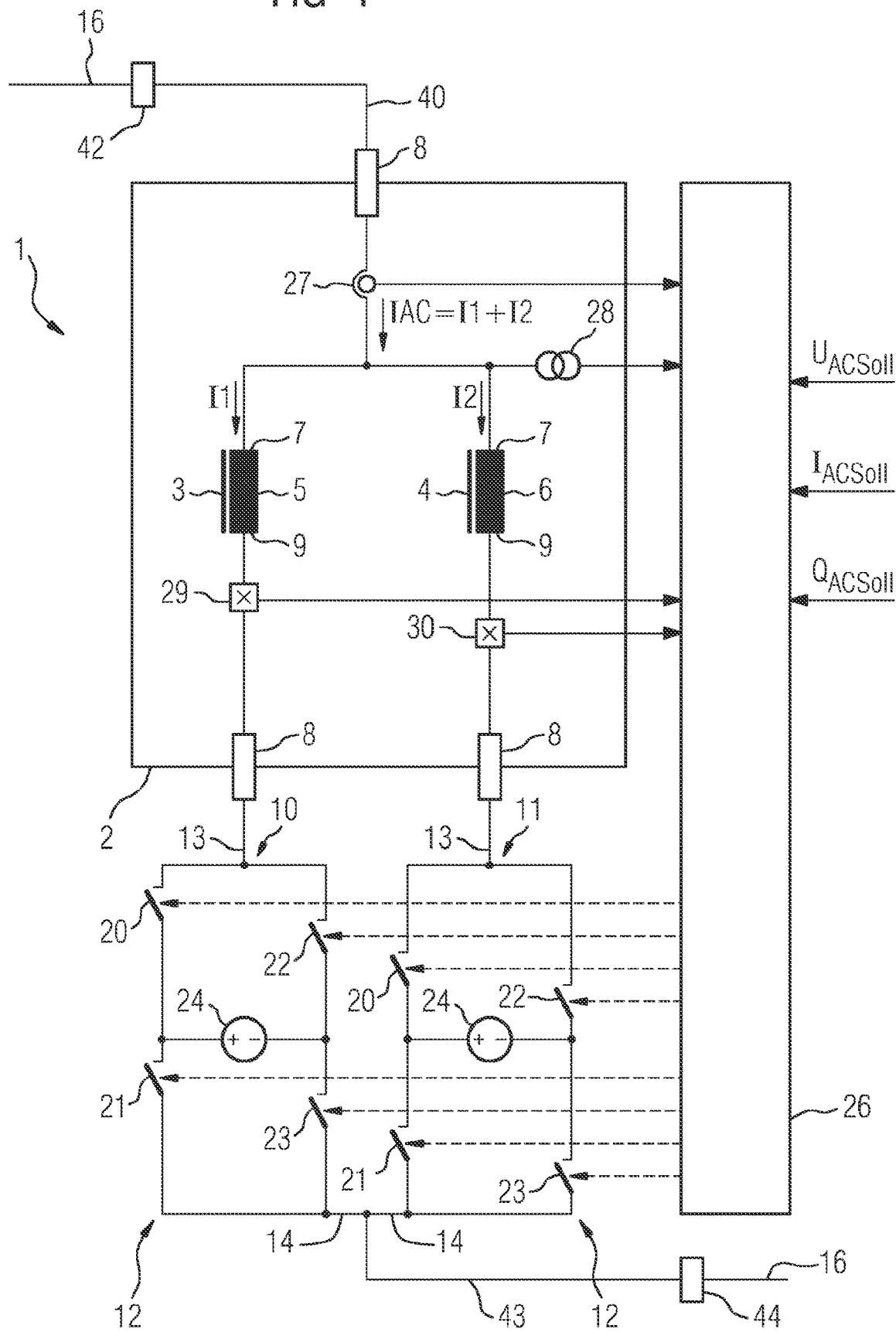
FIG. 1 shows a schematic illustration of an exemplary embodiment of the apparatus according to the invention.

FIG. 1 shows an exemplary embodiment of the apparatus 1 according to the invention which has a tank 2 filled with an insulating fluid. Mineral oils or else ester fluids or the like come into consideration as the insulating fluid. Gaseous insulating fluids are also possible within the scope of the invention.

The insulating fluid provides, on the one hand, the necessary dielectric strength for component parts of the apparatus 1, which are at a high-voltage potential, with respect to the tank 2 which is at ground potential. In addition, the insulating fluid is used to cool the components which generate heat during operation. In the exemplary embodiment shown in FIG. 1, the tank is filled with an ester fluid.

Arranged inside the tank 2 is a core which is composed of a magnetizable material, preferably a ferromagnetic material, for example iron. In order to avoid eddy currents, the core is assembled on iron sheets which rest flat on one another. In this case, the core forms a first core limb 3 and a second core limb 4 as core sections.

The first core limb 3 is surrounded by a first high-voltage winding 5. The second core limb 4 is surrounded by a second high-voltage winding 6. In order to form a closed magnetic or iron circuit, the yokes which are not illustrated in the figures and extend from the upper end of the core limb 3 to the upper end of the core limb 4 and from the lower end of the core limb 3 to the lower end of the core limb 4. Two return limbs which are likewise not illustrated in the figures, are not surrounded by a winding and extend parallel to the core limbs 3 and 4 on the right and on the left are also provided. In other words, a so-called 2/2 core is provided.

The first high-voltage winding 5 and the second high-voltage winding 6 each have a winding end 7, by way of which they are connected to a high-voltage bushing 8 which is used to guide the connection lines, which are at a high-voltage potential during operation, through the wall of the tank 2 that is at ground potential.

In this case, the high-voltage bushing 8 engages through the wall of the tank 2 and is equipped with an open-air connection at its free end arranged outside the tank 2. The open-air connection which is not illustrated in the figures is used to connect an air-insulated conductor 40, via which the high-voltage windings 5 and 6 are connected to a first high-voltage connection 42, via which the entire apparatus 1 can be connected to a phase conductor 16 of a high-voltage supply network. For each other phase conductor of the high-voltage network, which are not shown here for reasons of clarity, the apparatus 1 has an identical structure to that shown in FIG. 1. These components are also not shown for reasons of clarity. It goes without saying that cable connections are also possible within the scope of the invention.

At their ends 9 facing away from the first high-voltage connection 42, the first high-voltage winding 5 and the second high-voltage winding 6 are each connected to a saturation switching branch 10 and 11, respectively, arranged outside the tank 2, wherein each saturation switching branch 10, 11 has a two-pole submodule 12 connected, by way of a first connection terminal 13, to the respective high-voltage winding 5 and 6. By way of their second connection terminal 14, the submodules 12 are connected to the second high-voltage connection 44. A bushing 8 is again used to guide the connection line between high-voltage winding 5, 6 and saturation switching branch 10, 11 through the wall of the tank 2. In the exemplary embodiment shown, the second high-voltage connection 44 is likewise connected to the phase conductor 16. In other words, the apparatus 1 according to the invention which is shown is connected into the supply network in series with the phase conductor 16.

Within the scope of the invention, it is important for each saturation switching branch 10 or 11 to have a two-pole submodule 12 which has a bridge circuit comprising power semiconductor switches 20, 21, 22 and 23 and a DC voltage source 24 which is preferably unipolar and therefore has a fixed positive pole and a fixed negative pole. The saturation switching branches 10, 11 are mounted such that they are insulated from ground potential. Expedient insulation component parts, such as for example insulating posts or the like, are used for this purpose.

Within the scope of the invention, the bridge circuit may be a half-bridge or a full-bridge. In FIG. 1, each submodule has a full-bridge and comprises four power semiconductor switches 20, 21, 22 and 23. A half-bridge comprises only two of the power semiconductor switches. In order to expediently control the four power semiconductor switches 20, 21, 22 and 23, provision is made of a control unit 26 which can be supplied, on the input side, with desired values for the voltage $U_{ACSoll}$, the alternating current $I_{ACSoll}$ and the reactive power $Q_{ACSoll}$. A current sensor 27 is used to capture the alternating current $I_{AC}$ flowing from the phase conductor 16 to the high-voltage windings, wherein a voltage sensor 28 captures the voltage dropped on the high-voltage side of the high-voltage windings 5 and 6. The current sensor 27 and the voltage sensor 28 are connected to the control unit 26 via signal lines which are not illustrated in the figures. On the other end of the high-voltage winding 5 and 6, respectively, it is likewise possible to see sensors 29 and 30 which are likewise connected to the control unit 26 via signal lines and capture currents which flow between the respective submodule 12 and the respective high-voltage winding 5 or 6. The power semiconductor switches 20, 21, 22 and 23 of a submodule 12 can be changed, by means of expedient control signals represented by dashed lines, by the control unit 26 from a disconnection position, in which a current flow is interrupted via the power semiconductor switches, to a conducting position, in which a current flow is possible via the power semiconductor switches, or vice versa from the conducting position to the disconnection position.

The method of operation of the apparatus 1 is as follows: if the voltage captured by the voltage sensor 28 is positive, the power semiconductor switches 22 and 23 of the saturation switching branch 10 are closed. It shall be presupposed at this that the core limb 3 has previously been saturated by a direct current flowing from the submodule 12 of the first saturation switching branch 10 to the high-voltage winding 5, with the result that the AC resistance of the high-voltage winding 5 is lower than the AC resistance of the high-voltage winding 6 for the positive half-wave of the AC voltage. Virtually the entire alternating current $I_{AC}$ therefore flows to the second high-voltage connection 44 via the current path denoted Ii. In the positive half-wave of the AC voltage, the power semiconductor switches 21 and 22 are therefore closed, with the result that the DC voltage source 24 of the saturation circuit 11 drives a direct current which flows from the high-voltage winding 6 to the second high-voltage connection 44. During the positive half-wave of the AC voltage in the phase conductor 16, the second core limb can therefore be saturated in the desired manner.

In contrast, during the negative half-wave in which the voltage measured by the sensor 28 is negative, an alternating current $I_{AC}$ flows substantially via the second high-voltage winding 6, with the result that a saturation direct current is generated by closing the power semiconductor switches 20 and 23 and opening the power semiconductor switches 21 and 22 of the submodule 12 of the first saturation switching branch 10, which saturation direct current flows from the submodule 12 to the first high-voltage winding 5 or vice versa and therefore ensures the desired saturation of the core limb 3.

Figure 2:
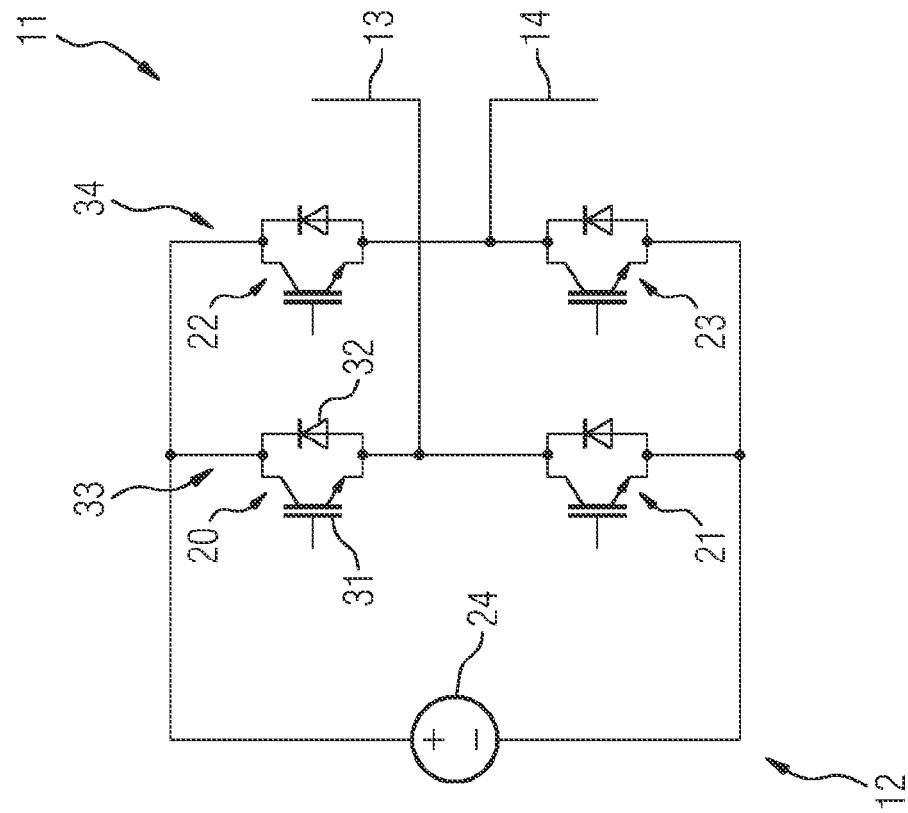
FIG. 2 shows the saturation switching branches of the apparatus according to FIG. 1.
Figure 2:
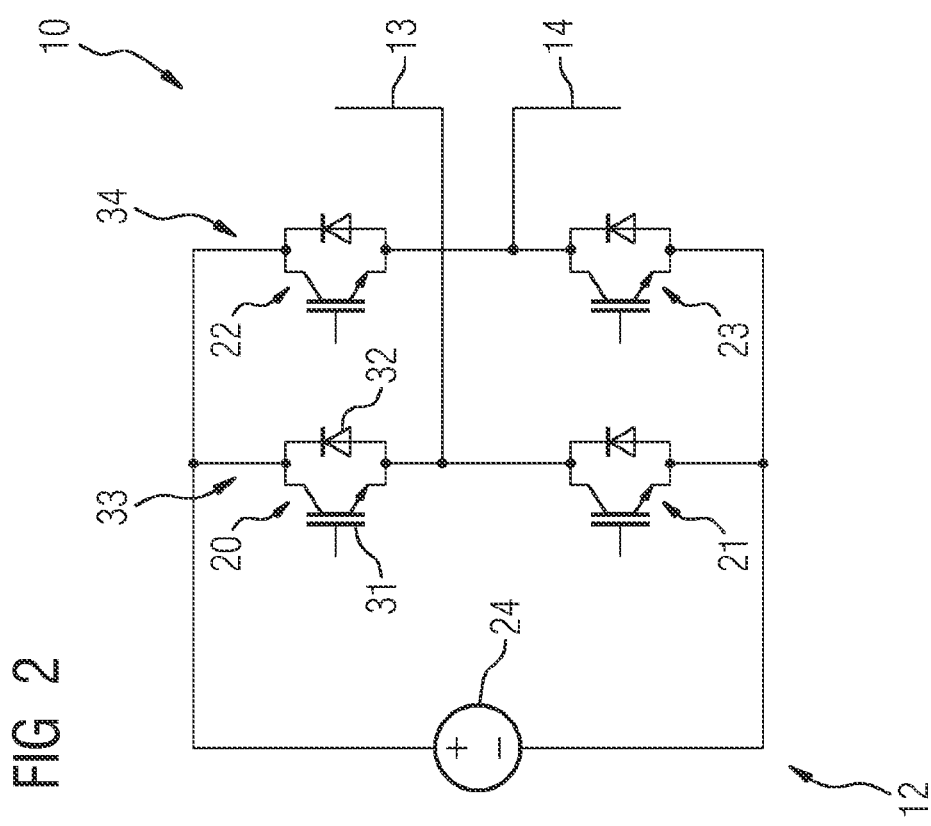

FIG. 2 shows the structure of the submodules 12 of the first and second saturation circuits 10, 11 in more detail. It can be seen that the submodules for both saturation switching branches 10 and 11 have an identical structure. It can also be seen that the power semiconductor switches 20, 21, 22 and 23 comprise a so-called IGBT 31, with which a freewheeling diode 32 is connected in parallel in an opposite sense. The structure of an IGBT with a freewheeling diode is fundamentally known, with the result that its method of operation does not need to be discussed in any more detail at this point. The important fact is that the freewheeling diode 32 is used to protect the IGBT by means of voltages in the reverse direction. In this case, the IGBT 31 and diodes are accommodated in a common switch housing. The IGBT 31 and the freewheeling diode 32 are referred to together as power semiconductor switches here.

Each submodule 12 is in the form of a so-called full-bridge and comprises a first series circuit branch 33 and a second series circuit branch 34 each comprising two power semiconductor switches 20, 21 and 22 and 23, respectively, which are connected in series. The potential point between the power semiconductor switches 20 and 21 is connected to the first connection terminal 13 and the potential point between the power semiconductor switches 22 and 23 of the second series circuit branch 34 is connected to the connection terminal 14 of the submodule 12.

Figure 3:
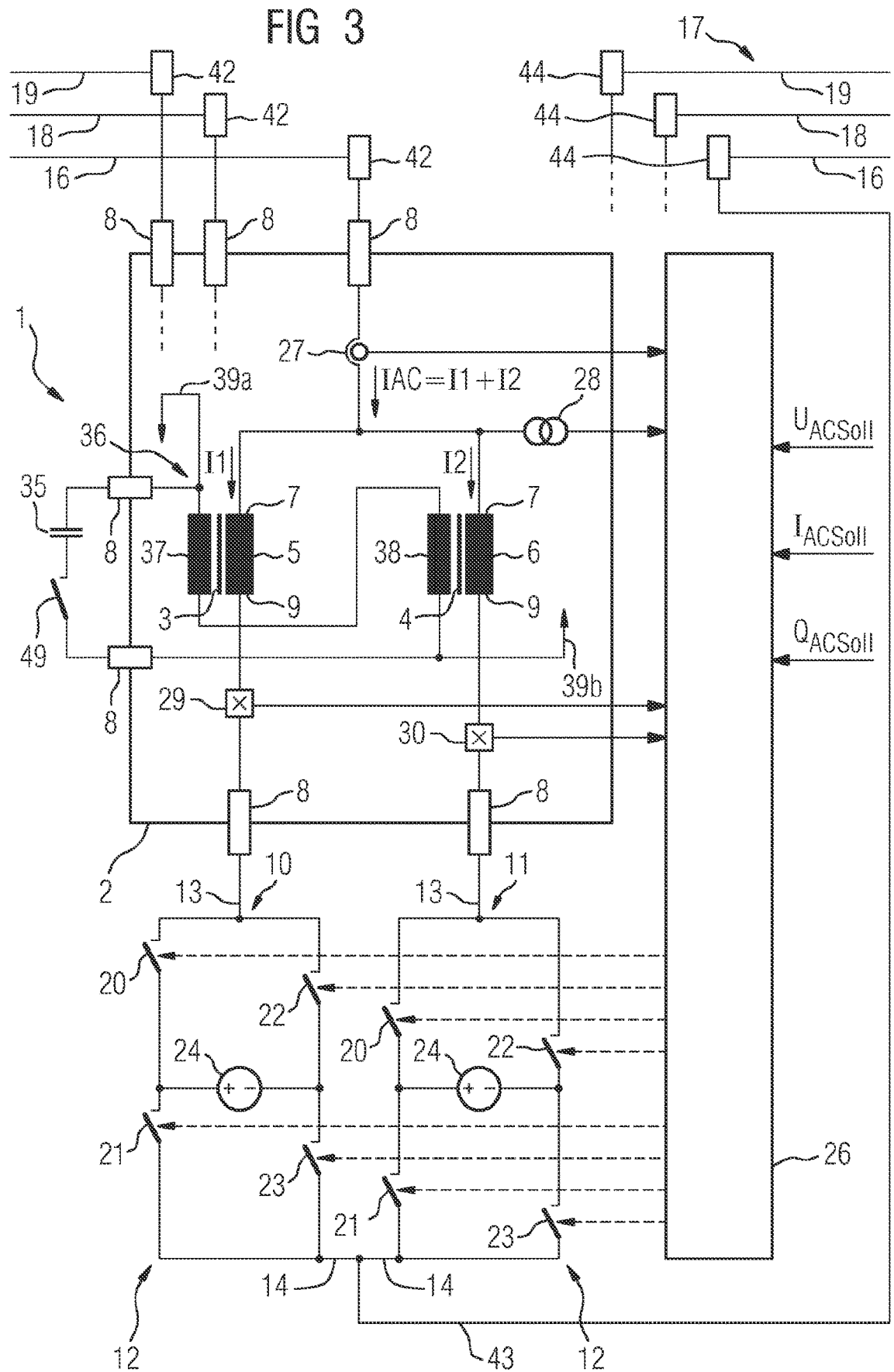
FIG. 3 shows a further exemplary embodiment of the apparatus according to the invention.

FIG. 3 shows a further exemplary embodiment of the apparatus 1 according to the invention which partly corresponds to the exemplary embodiment shown in connection with FIG. 1. In addition to the component parts or elements already described in FIG. 1, the exemplary embodiment of the apparatus 1, as shown in FIG. 3, also has a capacitively acting component part which is in the form of a capacitor 35 in the exemplary embodiment shown. The capacitor 35 is connected in parallel with a compensation winding 36, wherein the compensation winding 36 is composed of two partial compensation windings 37 and 38 which are connected in series with one another. The partial compensation winding 37 is inductively coupled to the first high-voltage winding and the second partial compensation winding 38 is inductively coupled to the high-voltage winding 6. In this case, the high-voltage windings 5 and 6 and the respective partial compensation winding 37 or 38 are arranged concentrically with respect to one another, wherein they surround the same core section 3 or 4 of the core which is otherwise not illustrated any further. FIG. 3 illustrates only one additional winding 36 for the phase shown there. However, further compensation windings are provided for the other phases in the tank 2 and have an identical structure and are connected to the capacitor 35 in the same manner. In this case, the compensation windings 36 of the different phases are connected to one another in a delta circuit. This delta circuit is indicated by arrows 39a and 39b. A switch 49 is also schematically illustrated in the parallel branch of the compensation winding, in which the capacitor 35 is arranged, which switch comprises two thyristors which are connected in parallel in opposite senses in the exemplary embodiment shown. With the aid of the electronic switch 49, the capacitor 35 can be connected in parallel with the compensation winding 36 or the action of the capacitively acting component part 35 can be suppressed.

The capacitor 35 is illustrated in FIG. 3 as an individual capacitor which is arranged outside the tank 2 of the FVSR. However, the capacitor 35 comprises a number of capacitors arranged in series or in parallel with one another and can therefore also be referred to as a capacitor bank. In this case, the number of capacitors connected in parallel or in series depends on the respective requirements, wherein the capacitive action can be increased or reduced.

The capacitor or, in other words, the capacitor bank 35 is arranged outside the tank 2 of the FVSR, like the switch 49. In a deviation from this, arrangement in a common tank is naturally also possible. In order to enable an electrical connection between the compensation winding 36 in the tank 2, expedient bushings 8 are provided again and make it possible to guide the high-voltage lines through the wall of the tank 2, which is at ground potential, with dielectric strength.

FIG. 4 shows a further exemplary embodiment of the apparatus 1 according to the invention having a first high-voltage connection 42 for connecting the phase conductor 16 and a second high-voltage connection 44 which is likewise provided for the purpose of connecting the phase conductor 16. The apparatus is therefore again connected in series with the phase conductor 16. As in exemplary embodiments shown in FIGS. 1 and 3, the saturation switching branches 10 and 11 are arranged outside the tank 2. High-voltage bushings 8 which each engage through the wall of the tank 2 are again used to connect the saturation switching branches to the high-voltage windings 5 and 6 arranged in the tank 2, wherein an outer insulating body provides the necessary dielectric strength with respect to the tank 2 at ground potential.

In this case, the saturation switching branches 10, 11 are arranged on a high-voltage platform 50 which has a planar supporting structure 51 and two insulating posts made of a non-conductive material which are provided with ribs on the outside. One end of the insulating posts 52 is permanently anchored in the ground and the end of the insulating posts facing away from the ground is permanently connected to the supporting plate 51.

Two insulating posts 52 can be respectively seen in FIGS. 4, 5 and 6. However, it is pointed out at this point that further insulating posts which are not illustrated in the figures are possible for supporting the supporting structure 51. The insulators or insulating posts 52 make it possible for the saturation switching branches 10 and 11 to be at a high-voltage potential. This therefore applies to the power electronics of the power semiconductor switches. Complicated potential isolation has become superfluous.

FIG. 5 shows a further exemplary embodiment of the apparatus according to the invention which differs from the exemplary embodiment shown in FIG. 4 in that the second high-voltage connection 44 is not directly connected to the saturation switching branches 10, 11 via a star point. Rather, the second high-voltage connection 44 is directly connected to the high-voltage winding ends 9 arranged in the tank 2 via a bushing 8. In this case, the high-voltage windings 5 and 6 each have a center connection 53 which is used to connect the saturation switching branches 10 and 11 arranged on the platform 50. The saturation switching branches 10 and 11 are connected to one another via an expedient interconnection 54.

FIG. 6 shows a further exemplary embodiment of the apparatus according to the invention which differs from the exemplary embodiment shown in FIG. 5 in that only one saturation switching branch is arranged on the high-voltage platform 50 and is connected to both high-voltage windings 5, 6, wherein expedient switches are provided in order to bring about the desired saturation of the core sections 3 and 4.

The invention claimed is:

1. An apparatus for dynamic load flow control in a high-voltage network having a phase conductor and at least a first high-voltage connection for connection to the phase conductor, the apparatus comprising:
    a tank;
    first and second core sections being part of a closed magnetic circuit and being disposed in said tank;
    a first high-voltage winding surrounding said first core section;
    a second high-voltage winding surrounding said second core section, said second high-voltage winding connected in parallel with said first high-voltage winding;
    at least one saturation switching branch configured to saturate said core sections, said at least one saturation switching branch having controllable power semiconductor switches, said at least one saturation switching branch being disposed outside of said tank and mounted to be electrically insulated from ground potential; and
    a control unit for controlling said power semiconductor switches;
    said first and second high-voltage windings being connected to the first high-voltage connection and said first and second high-voltage windings configured to be connected to said at least one saturation switching branch; and
    a second high-voltage connection for connection to the phase conductor, said second high-voltage connection being connected directly, or through said at least one saturation switching branch, to at least one of said first and second high-voltage windings.

2. The apparatus according to claim 1, which further comprises a high-voltage platform having a supporting structure and electrically insulating supporting columns supporting said high-voltage platform on the ground, said at least one saturation switching branch being disposed on said high-voltage platform.

3. The apparatus according to claim 1, which further comprises at least one high-voltage bushing installed on said tank, said at least one high-voltage bushing connecting said at least one saturation switching branch to at least one of said high-voltage windings.

4. The apparatus according to claim 1, wherein at least one of said first and second high-voltage windings has a center connection connecting said at least one high-voltage winding to said at least one saturation switching branch, and said high-voltage windings have winding ends each being connected to a respective one of the first and second high-voltage connections.

5. The apparatus according to claim 1, wherein each of said first and second high-voltage windings has a center connection connected to said at least one saturation switching branch.

6. The apparatus according to claim 1, wherein said at least one saturation switching branch has at least one two-pole submodule with a bridge circuit having power semiconductor switches and a DC voltage source, said DC voltage source being either connected in series with at least one of said first and second high-voltage windings or bridged, depending on a control of said power semiconductor switches.

7. The apparatus according to claim 6, wherein:
    said at least one two-pole submodule forms a full-bridge circuit having a first series circuit branch and a second series circuit branch each being connected in parallel with said DC voltage source;
    said at least one two-pole submodule has first and second connection terminals;
    each of said series circuit branches has a series circuit including two power semiconductor switches;
    said first series circuit branch has a potential point between said power semiconductor switches being connected to said first connection terminal; and
    said second series circuit branch has a potential point between said power semiconductor switches being connected to said second connection terminal.

8. The apparatus according to claim 6, wherein each of said power semiconductor switches is an IGBT with a freewheeling diode connected in parallel in an opposite sense, a GTO or a transistor switch.

9. The apparatus according to claim 6, wherein each of said DC voltage sources includes an energy storage device.

10. The apparatus according to claim 9, wherein said energy storage devices are configured to be connected to a supply network.

11. The apparatus according to claim 1, which further comprises compensation windings inductively coupled to said first and second high-voltage windings, and at least one capacitively acting component part connected to said compensation windings.

12. The apparatus according to claim 11, wherein said capacitively acting component part has capacitors.

\* \* \* \* \*